United States Patent [19]

Buzga

[11] 4,081,382
[45] Mar. 28, 1978

[54] APPARATUS FOR SEPARATING PARTICULATE SOLIDS FROM LIQUIDS

[75] Inventor: Heinrich Buzga, Grevenbroich, Germany

[73] Assignee: Maschinenfabrik Buckau R. Wolf Aktiengesellschaft, Grevenbroich, Germany

[21] Appl. No.: 792,017

[22] Filed: Apr. 28, 1977

[30] Foreign Application Priority Data

Apr. 12, 1976   Germany .............................. 2616035

[51] Int. Cl.² ............................................. B01D 35/00
[52] U.S. Cl. .................................... 210/414; 15/303; 34/57 E; 210/416 R
[58] Field of Search ...................... 210/68, 304, 416 R, 210/416 AS, 416 DW, 416 F, 416 L, 455, 414, 512 R; 34/8, 9, 58, 57 D, 57 E; 15/303

[56] References Cited

U.S. PATENT DOCUMENTS

| | | | |
|---|---|---|---|
| 3,045,359 | 7/1962 | Billingsley | 210/512 R X |
| 3,458,045 | 7/1969 | Dudley | 210/415 X |
| 3,797,661 | 3/1974 | Buzga | 210/73 R |
| 3,805,401 | 4/1974 | Fontein | 34/58 X |

Primary Examiner—William A. Cuchlinski, Jr.
Attorney, Agent, or Firm—Michael J. Striker

[57] ABSTRACT

An apparatus for separating particulate solids from liquids includes a blower which is mounted for rotation between two upright walls. A sieve surrounds the rotor with a spacing therefrom and a solid-liquid mixture to be separated is introduced onto a portion of the sieve. The flow of gaseous medium advanced by the blower is directed onto the sieve by an elongated curved guide element having one end close to the portion of the sieve, another end close to the blower in the region of the first-mentioned end, and a curved portion extending from the one to the other end around the blower opposite to the direction of rotation of the blower at a decreasing distance from the latter. The guide element bounds with the sieve a passage the flow-through cross section of which decreases in the direction of advancement of the gaseous medium which thus partly propagates along the passage and partly escapes therefrom through the sieve and thus entrains and expels the liquid from the mixture through the sieve. Breaking elements may be provided in the passage which disintegrate agglomerations formed during the propagation of the mixture through the passage. Detaching projections extend from an outwardly facing major surface of the guide element into the passage and serve to detach the flow of the liquid of the mixture from such major surface.

7 Claims, 1 Drawing Figure

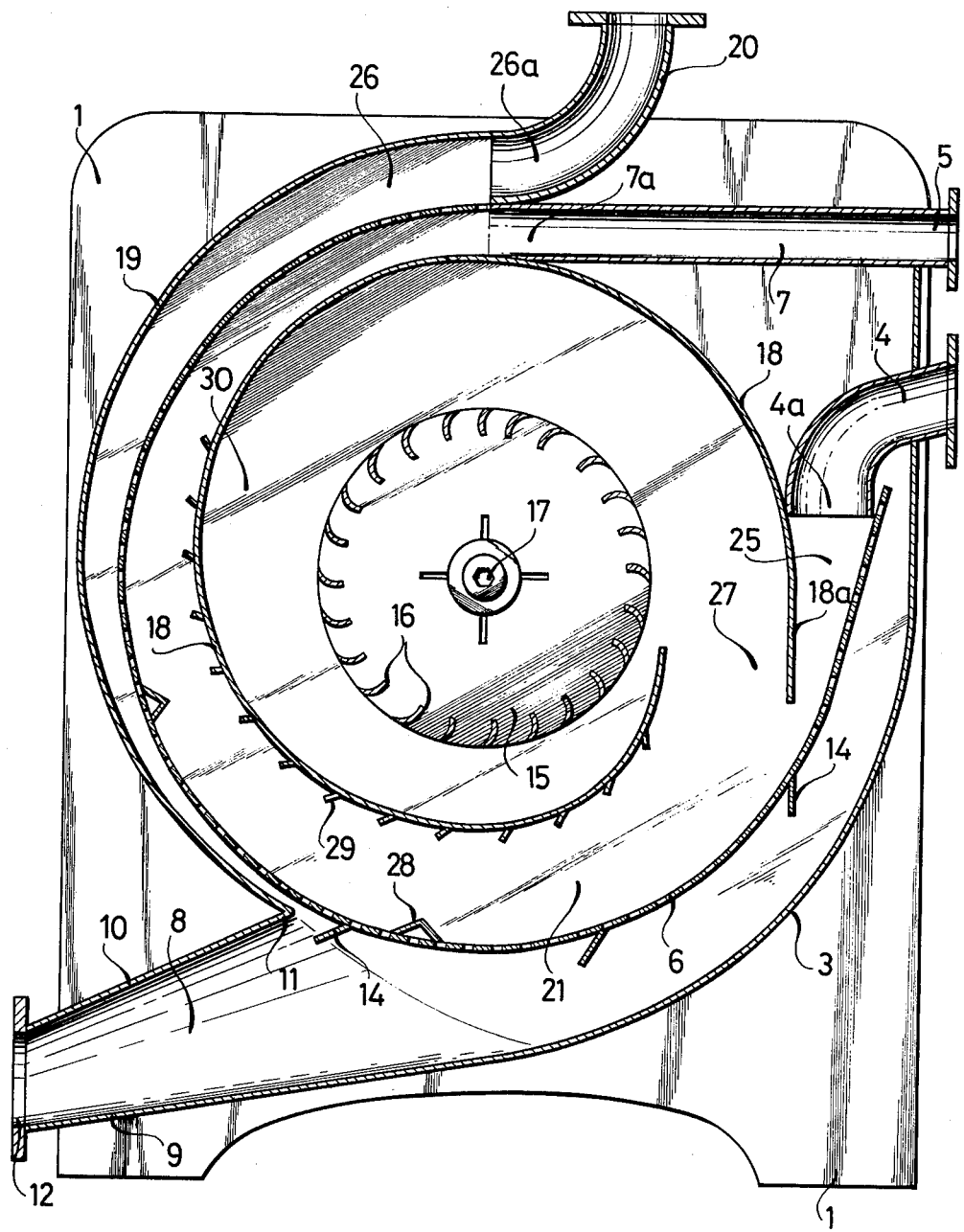

APPARATUS FOR SEPARATING PARTICULATE SOLIDS FROM LIQUIDS

BACKGROUND OF THE INVENTION

The present invention relates to an apparatus for separating particulate solids from liquids in general, and more particularly to an apparatus for removing water from and for drying granules, especially granules of synthetic plastic material granulated under water.

Material granulated under water is present, after such granulation, in a large volume of water in form of a mixture therewith. The granules, prior to their further use, must be separated from water and/or dried. The separation of water from the granules and the drying of the latter have heretofore created some problems, particularly since the separating devices had to be rather huge in view of the substantial volume of water to be separated from the granules during each separating operation.

In order to improve this unsatisfactory situation, there have been already proposed, in the commonly owned U.S. Pat. No. 3,797,661, a method of separating granulates from a liquid and an apparatus capable of performing such a method, particularly for use in drying of synthetic plastic materials which have been granuled under water. There, it has been proposed to dry the granules of synthetic plastic material on a sieve by means of a gas, the amount and/or speed of which are the same over the major portion of the sieve and the advancement energy is resolved in a flow-through component which forces the water through the sieve and a propagating component which propels the granulate over the sieve.

The arrangement for performing the above method includes two parallel lateral walls of which one is formed with a gas-inlet opening, and a blower mounted between the parallel lateral walls for rotation. The arrangement further includes a curved sieve wall surrounding the blower and having interruptions for the entrance of the granulate-water mixture and the discharge of the dry granulate, such interruptions communicating with inlet and outlet conduits, respectively. The inlets and outlets and the associated interruptions ae spatially separated from one another, and a gas-guiding sheet extends from the inlet interruption toward the outlet interruption and so partially surrounds the blower that the distance thereof from the blower increases in the direction of rotation of the blower.

When the granulate-water mixture enters into the region of the sieve, it is first separated from the excessive water which is not tied, in one way or another, to the granules. After that, the granulate which has been rid of the excessive water is pressed against the sieve by the pressurized gas issuing from the blower which advances at a much higher speed than the granulate. As a result of this, the water present in the interstices between the granules is continuously detached from the granulate, despite the low mechanical engagement, and is conducted, together with a part of the pressurized gas, through the sieve. Inasmuch as the advancing pressurized gas imparts a movement component to the granuulate on the sieve, the adhesive water film is continuously detached from the individual granules and also expelled through the sieve. Finally, the remaining water vaporizes.

The above-mentioned method achieves, in a relatively small arrangement, a quick separation of water from granulate, as a result of a stronge aeration of the predried granulate. As a result of this, the granulate is very quickly and by resorting to simple means, brought into a condition suitable for the storage and further use of the granulate.

The two lateral walls may be part of a casing from which the expelled or separated water is withdrawn by means of a water conduit, and a source of vacuum may communicate with such water conduit in order to accelerate the penetration of the water through the sieve, so that, at any time, a sufficiently large amount of the pressurized gas flows through the sieve and, consequently, entrains the desired amount of water.

In order to improve the economies of the method, it has also been proposed to separately intercept or collect the pressurized gas penetrating through the sieve and the water expelled through the sieve, and to separately prepare such media after the discharge thereof from the casing for reintroduction thereof into the process as separately circulating media.

The advantage of this method is to be seen in the fact that the amount of the drying or separating pressurized gas is constant over the major part of the sieve. However, experience with this type of arrangement has shown that the performance of this arrangement still leaves much to be desired, particularly in terms of efficiency and throughput for given dimensions of the arrangement.

SUMMARY OF THE INVENTION

It is a general object of the present invention to avoid the above-mentioned disadvantages of the prior art.

More particularly, it is an object of the present invention to devise an apparatus for separating particulate solids from liquids which is not possessed of the disadvantages of the above-discussed apparatus.

Yet another object of the present invention is to so construct the apparatus as to be simple in construction, inexpensive to manufacture, and reliable in operation.

A concomitant object of the present invention is to design an apparatus for separating particulate solids from liquids which has an increased throughput for given dimensions than heretofore known.

Still another object of the present invention is to provide an apparatus of the above-mentioned type which has an improved economy as compared to the prior art.

In pursuance of these objects and others which will become apparent hereafter, one feature of the present invention resides, briefly stated, in an apparatus for separating particulate solids, especially granules of synthetic plastic materials, from liquids, which comprises a pair of upright walls bounding a space; a blower accommodated in said space and mounted on said upright walls for rotation; means for admitting a gaseous medium to said blower to be advanced by the latter during the rotation thereof in a predetermined direction; a sieve extending between said upright walls across said space and surrounding said blower with a spacing therefrom; means for introducing a solidliquid mixture to be separated into said spacing and onto said sieve at one portion of the latter; means for discharging the separated solids from said spacing at another portion of said sieve which is circumferentially spaced from said one portion; and means for directing the flow of the advancing gaseous medium onto said sieve, including an elongated curved guide element extending between said upright walls in said spacing and having one end located close to said sieve at said introducing means, another end located close to said blower in the region of said one end, and a curved portion extending from said one to said other end around said blower opposite to said direction of rotation of the blower at a decreasing distance from the latter, said guide element bounding with said sieve a passage of decreasing flow-through cross section in the direction of advancement of the gaseous medium whereby the latter gradually and uniformly escapes, and simultaneously expels the liquid, from said passage through said sieve and also propagates along said passage toward said discharging means for propelling the separated solids toward the latter.

As a result of this particular configuration of the guide element, there is obtained a gas-collecting space around the blower which has an ever-increasing flow-through cross section in direction towards its communication with the above-mentioned passage, out of which gas-collecting space, the pressurized gas is admitted into the passage in a concentrated fashion at one location so that, despite the fact that a part of the pressurized medium is continuously discharged through the sieve, the speed of advancement of the pressurized gas through the passage remains constant. As a result of this, the same end effect is obtained as in the above-discussed arrangement, in a very simple manner.

As a result of the above-discussed expedient, the blower may be of smaller dimensions as compared to that of the prior-art arrangement, for the same or even greater throughput of the granulate-water mixture. The basically spiral-shaped gas-collecting space which surrounds the blower directs the pressurized gas in an optimum manner to the exit from the gas-collecting space into the passage and thus reduces the level of noise generated by the apparatus and simultaneously increases the efficiency of the arrangement in its entirety without requiring any additional space.

A particular advantage of the expedient according to the present invention is to be seen in the fact that, at the same consumption of space, with improved efficiency and reduced noise level, the through-put capacity of the arrangement according to the present invention is almost twice that of the above-discussed prior-art arrangement.

It is further advantageous when the apparatus of the present invention comprises additional walls extending between said upright wall around said sieve and constituting therewith a casing. Then, the apparatus may further comprise means for withdrawing the separated liquid and gaseous medium from the interior of such casing. The withdrawing means may include means for maintaining the area between said sieve and said additional walls at subatmospheric pressure, to a pronounced advantage.

The mixture tends to form agglomerations during the propagation thereof through the passage. Then, it is particularly advantageous for the apparatus to comprise means for disintegrating such agglomerations, including at least one breaking element in the passage upwardly of the sieve, the breaking element being preferably connected to and extending from said sieve into said passage.

The liquid of the mixture tends to flow, in form of a film or of droplets, along an outwardly facing major surface of the guide element; then, it is currently preferred to provide means for detaching the liquid from such major surface, including at least one detaching projection extending from the guide element into the passage, such detaching projection preferably enclosing an acute angle with a tangential plane of the major surface as considered in the direction of propagation of the gaseous medium.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing illustrates an example of the embodiment of the present invention, in vertical cross section.

DETAILED DISCUSSION OF THE PREFERRED EMBODIMENT

Referring now to the drawing in detail, it may be seen therein that the apparatus of the present invention, first of all, includes two smooth upright walls 1 and 2 which extend parallel to one another, the wall 2 not being seen in the drawing inasmuch as it is located frontwardly of the plane of the cross section. The lower ends of these lateral upright walls 1 and 2 are angularly bent so that they serve as respective support bases for the apparatus. A guide wall 3 is provided between these two upright walls 1 and 2, the guide wall 3 being fluid-tightly connected with the respective lateral walls 1 and 2. An inlet conduit 4 for a water-granulate mixture, and a discharge conduit 5 for a dry granulate, are arranged upwardly of the guide wall 3. The inlet conduit 4 has an inlet opening 4a, and a sieve wall 6 commences at such inlet opening 4, the sieve wall 6 having a straight portion and then a curved portion as considered in the direction away from the inlet opening 4a, the curved portion ending in the region of an outlet port 7a of a discharge channel 7. The discharge channel 7 is rigidly connected with the discharge conduit 5.

The guide wall 3 merges into a straight bottom plate 9 which bounds, together with an upper wall 10, a water-collecting space 8 and is connected to an exit nipple 12 for expelled water and for moisture-enriched gas.

A non-illustrated conventional vacuum source can communicate with the nipple 12, in order to accelerate the issuance of water and of moist air through the nipple 12. Also, a control arrangement of conventional construction may be mounted on the nipple 12, which prevents the possibility that the air which penetrates through the sieve escapes entirely.

Underneath the sieve wall 6 and in the region of the guide wall 3, there are provided guide sheets 14 which detach the water which has penetrated through the sieve 6 from the latter and guide such water into the watercollecting space 8. Were it not for the provision of these guide sheets, part of the water could remain attached to the major surface of the sieve 6 which faces the guide wall 3 and could flow along the sieve wall 6 all the way to the upper end thereof.

A blower 15 having blower blades 16 is mounted on a blower shaft 17 for rotation, within the space bounded by the sieve wall 6. The blower 15 is driven in rotation by a non-illustrated motor which is mounted on the lateral wall 1 or 2. The blower 15 is so arranged that a spacing is defined between the outer periphery of the blower 15 and the sieve wall 6, which spacing has been identified with the reference numeral 21.

An extension sheet 18a is arranged underneath the inlet opening 4a which bounds, together with the straight part of the sieve wall 6 a pre-separation channel 25 for separating non-adhering water, the channel 25 communicating with the opening 4a and decreasing is cross section in direction away from the latter.

A gas-guide element 18 is provided between the inlet conduit 4 and the outlet channel 7, which is connected to the upper end of the sheet 18a and extends, in the spacing 21 all the way around the blower 15 to the region of the lower end of the extension sheet 18a and thus defines a generally spiral-shaped gas-collecting space 30 which decreases in flow-through cross-section oppositely to the direction of rotation of the blower 15, the gas-collecting space 30 having an outlet opening 27.

An additional casing wall 19 is connected to the uppermost edge 11 of the upper wall 10 of the water-collecting space 8 and partially surrounds the sieve wall 6. The distance between the sieve 6 and the casing wall 19 increases in the direction toward the outlet end of the wall 19. The casing wall 19 and the sieve wall 6 together bound a gas-outlet channel 26 of increasing flow-through cross-section, the channel 26 having an outlet opening 26a which communicates with a gas-outlet nipple 20. An air-conditioning arrangement of conventional construction, which has not been illustrated, communicates with the nipple 20 and treats the air emerging from the latter in order to be able to recirculate such air, after the treatment thereof into the circulation through the apparatus of the present invention.

The non-illustrated upright wall 2 is provided, in a conventional manner, in the region of the blower 15, with a gas-inlet opening which is covered by a non-illustrated gas-inlet sieve.

Having so discussed the construction of the apparatus of the present invention, the operation thereof will now be briefly explained.

The granulate-water mixture is introduced into the inlet conduit 4. From there, it is introduced into the pre-separating channel 25 of decreasing flow-through cross-section, from where the excessive water which is not tied to the granules of the mixture or to agglomerations of such granules, is immediately pressed through the sieve wall 6 and flows into the water-collecting space 8.

The granulate which has been pre-separated in the above-mentioned manner and which flows downwardly due to its own gravity, is now acted upon by a great amount of pressurized air which is generated by the blower 15, collected in the gas-collecting space 30, and issuing from the latter through the opening 27. As a result of the great amount of the pressurized gas which enters the passage 21, the granulate is pressed against the sieve 6 and the water present in the mixture of water with granulate is expelled through the sieve 6.

The gas stream which is produced by the blower 15 also advances the granulate along the sieve wall 6 into the region of guide baffles 28 arranged in the passage 21. Before the granulate reaches this region, part of the adhering and interstitial water is also separated from the particulate granulate. The water which penetrates through the sieve 6, and also the volume of gas which penetrates through the sieve 6, are jointly collected in the water-collecting space 8 and discharged therefrom through the outlet nipple 12.

As mentioned above, the passage 21 decreases in cross section in the direction of advancement of the gas stream. The granulate present in the passage 21 at the above-mentioned region thereof is lightly thrown against the guide baffles 28 so that the granules or the agglomerations of such granules, due to the shape of the guide baffles 28, are first impacted against the lower side of the gas-guiding element 18 and then returned back to the sieve 6 and impinged thereupon. In this manner, there is obtained a so-called transverse aeration of the granulate, inasmuch as the flowing gas continues to advance in the same direction as before along the sieve wall 6. In addition to the slight impingement effect, there comes into existence also a high relative acceleration between the granulate and the pressurized gas. The above-mentioned impingement effect, transverse aeration, and relative acceleration, result in detachment of adhesive water film from the individual granules, such detached water being entrained in the gaseous medium and carried by the latter through the sieve wall 6 and thus into the gas-exit channel 26.

The major surface of the guide element 18 which faces toward the sieve 6 is provided with detaching projections 29 which are inclined at an acute angle to a tangential plane of the guide element 18 at the particular location of attachment of the respective detaching projection 29. The detaching projections 29 detach a water film or water droplets depositing on such major surface of the guide element 18, from the latter, to be entrained by the gaseous medium or air and carried by the same through the sieve wall 6 and then toward the outlet nipple 20.

It will be understood that each of the elements described above, or two or more together, may also find a useful application in other types of constructions differing from the types described above.

While the invention has been illustrated and described as embodied in an apparatus for separating granulate from water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Apparatus for separating particulate solids, especially granules of synthetic plastic materials, from liquids, comprising a pair of upright walls bounding a space; a blower accommodated in said space and mounted on said upright walls for rotation; means for admitting a gaseous medium to said blower to be advanced by the latter during the rotation thereof in a predetermined direction; a sieve extending between said upright walls across said space and surrounding said blower with a spacing therefrom; means for introducing a solid-liquid mixture to be separated into said spacing and onto said sieve at one portion of the latter; means for discharging the separated solids from said spacing at another portion of said sieve which is circumferentially spaced from said one portion; and means for directing the flow of the advancing gaseous medium onto said sieve, including an elongated curved guide element extending between said upright walls in said spacing and having one end located close to said sieve at said introducing means, another end located close to said blower in the region of said one end, and a curved portion extending from said one to said other end around said blower opposite to said direction of rotation of said blower at a decreasing distance from the latter, said guide element bounding with said sieve a passage of decreasing flow-through cross section in the direction of advancement of the gaseous medium whereby the latter gradually and uniformly escapes, and simultaneously expels the liquid, from said passage through said sieve and also propagates along said passage toward said discharging means for propelling the separated solids toward the latter.

2. Apparatus as defined in claim 1; and further comprising additional walls extending between said upright walls around said sieve and constituting a casing with said upright walls; and further comprising means for withdrawing the separated liquid and the gaseous medium from the interior of said casing.

3. Apparatus as defined in claim 2, wherein said withdrawing means includes means for maintaining the area between said sieve and said additional walls at subatmospheric pressure.

4. Apparatus as defined in claim 1, wherein said mixture tends to form agglomerations during the propagation thereof through said passage; and further comprising means for disintegrating such agglomerations, including at least one breaking element in said passage upwardly of said sieve.

5. Apparatus as defined in claim 4, wherein said breaking element is connected to and extends from said sieve into said passage.

6. Apparatus as defined in claim 1, wherein the liquid of the mixture tends to flow along an outwardly facing major surface of said guide element; and further comprising means for detaching the liquid from said major surface, including at least one detaching projection extending from said guide element into said passage.

7. Apparatus as defined in claim 6, wherein said detaching projection encloses an acute angle with a tangential plane of said major surface as considered in the direction of propagation of the gaseous medium.

* * * * *